United States Patent [19]
Genduso et al.

[11] Patent Number: 5,893,148
[45] Date of Patent: Apr. 6, 1999

[54] SYSTEM AND METHOD FOR ALLOCATING CACHE MEMORY STORAGE SPACE

[75] Inventors: Thomas B. Genduso, West Palm Beach; Wan L. Leung, Coral Springs, both of Fla.

[73] Assignee: International Business Machines Corporation, Armonk, N.Y.

[21] Appl. No.: 966,956

[22] Filed: Nov. 10, 1997

Related U.S. Application Data

[63] Continuation of Ser. No. 665,597, Jun. 18, 1996, abandoned, which is a continuation of Ser. No. 206,385, Mar. 3, 1994, abandoned.

[51] Int. Cl.$^6$ .................................................. G06F 12/08
[52] U.S. Cl. .......................................... 711/132; 711/129
[58] Field of Search .................................. 711/129, 132, 711/173, 118

[56] References Cited

U.S. PATENT DOCUMENTS

| | | | |
|---|---|---|---|
| 3,786,432 | 1/1974 | Woods | 365/230.09 |
| 3,829,837 | 8/1974 | Farr, Jr. | 711/4 |
| 3,889,243 | 6/1975 | Drimak | 711/132 |
| 4,386,402 | 5/1983 | Toy | 711/3 |
| 4,517,640 | 5/1985 | Hattori et al. | 711/126 |
| 4,530,049 | 7/1985 | Zee | 711/132 |
| 4,583,165 | 4/1986 | Rosenfeld | 711/213 |
| 4,652,996 | 3/1987 | Bowden | 711/118 |
| 4,670,839 | 6/1987 | Pilat et al. | 711/119 |
| 4,704,679 | 11/1987 | Hassler et al. | 711/220 |
| 4,811,208 | 3/1989 | Myers et al. | 711/132 |
| 4,916,604 | 4/1990 | Yamamoto et la. | 711/130 |
| 4,922,414 | 5/1990 | Holloway et al. | 711/207 |
| 4,969,091 | 11/1990 | Muller | 395/569 |
| 5,029,070 | 7/1991 | McCarthy et al. | 711/143 |
| 5,043,870 | 8/1991 | Ditzel et al. | 711/132 |
| 5,107,457 | 4/1992 | Hayes et al. | 711/132 |
| 5,151,895 | 9/1992 | Vacon et al. | 370/420 |

OTHER PUBLICATIONS

Schneider et al., "Concepts in Data Structures & Software Development", 1991, pp. 131–136.

*Primary Examiner*—Eddie P. Chan
*Assistant Examiner*—Kevin L. Ellis
*Attorney, Agent, or Firm*—Calfee, Halter & Griswold LLP

[57] ABSTRACT

A stack cache memory mechanism and method for managing the mechanism are provided. The mechanism comprises a data array including a plurality of storage elements in which stack data may be stored, and a plurality of individual stack tag sets for identifying beginning and ending locations of a corresponding plurality of individual stacks contained within the data array. Each of the individual stack tag sets comprise (i) a first register for containing an address in the data array corresponding to the top of a stack associated with that individual stack tag set and (ii) a second register for containing an address in the data array corresponding to the bottom of a stack associated with that individual stack tag set. A backward pointer array comprises a plurality of backward pointers which map each of the plurality of stack tag sets to address locations in the data array. Allocation logic determines which of the data array storage elements are currently included within existing stacks, as defined by the plurality of backward pointers and the plurality of stack tag sets, and which of the data array storage elements are available to be allocated to a stack.

21 Claims, 6 Drawing Sheets

SYSTEM AND METHOD FOR ALLOCATING CACHE MEMORY STORAGE SPACE

This is a continuation of application Ser. No. 08/665,597, filed on Jun. 18, 1996, which is a continuation of Ser. No. 08/206,385 filed on Mar. 3, 1994 both now abandoned.

RELATED APPLICATION

Application Ser. No. 08/205,737; Filed Mar. 3, 1994: Entitled CACHE MEMORY STORAGE SPACE MANAGEMENT SYSTEM AND METHOD (Further identified as Attorney Docket BC9-92-134); incorporated herein by reference as if it had been fully set out.

FIELD OF THE INVENTION

The present invention relates generally to memory hardware for computer systems and more particularly to a hardware implementation of cache memory management logic which supports software stacks.

BACKGROUND OF THE INVENTION

The memory included with computer systems typically includes a memory cache which comprises buffer storage that contains instructions and data frequently accessed by the processor in the system. Caches are typically constructed of cache lines which are boundaries between blocks of storage that map to a specific area in the cache. The cache lines are usually made up of a plurality of words having adjacent addresses.

Computer systems which include memory caches often support the concept of memory stacks. Stacks represent areas in memory which store temporary register information and return addresses of subroutines. The number of stacks which may be supported and the length of the stacks varies between systems.

Stacks permit POP read and PUSH write operations, also referred to as pushdown storage. The operation of the stack in POP and PUSH operations is a last-in-first-out type of operation, that is, the last word written (PUSHED) into the stack is the first word retrieved (POPPED) from the stack.

Many of the computers in use today, however, are register based and do not directly support stacks in hardware. These types of computers therefore implement memory stacks in software (application code), and most high level programming languages make use of stacks to support a variety of programming constructs.

The actual memory for storing the data which make up stacks is typically allocated on a stack-by-stack basis. Each stack is provided with a certain segment of the cache storage area which corresponds to that stack. In multi-tasking environments, individually operating programs may each involve operations to separate stacks. Accordingly, at any time during operation of a multi-tasking system, a plurality of stacks may be in existence. In multi-tasking environments which generate a large number of stacks, designating memory for each of the separate stacks can result in exhaustion of available cache space.

Accordingly, it is an object of the present invention to provide a cache design which supports execution of stack operations in a multi-tasking computer environment. It is a further object of the invention to provide such a stack cache design which permits each of a plurality of stacks of various sizes to be mapped to a common cache storage space, such that the cache design may be implemented using less memory than known designs.

SUMMARY OF THE INVENTION

A stack cache management mechanism for a computer system is provided for managing stack cache operations within the system, including PUSH write and POP read operations to and from stacks. The mechanism provides a free pool of storage in the form of a single data array in which data from a plurality of stacks of varying lengths may be stored. In addition to the data array, the management mechanism includes stack tag sets for identifying the beginning and ending locations of stacks defined within the single data array, a backward pointer array for mapping the stacks into the data array, and a free space manager for identifying space in the data array which is available to be written to.

The data array comprises an array of storage locations, providing a fixed amount of storage which contains the actual stack data. The array of storage locations store the data which have been placed into a stack as a result of a PUSH operation. Each storage location in the data array contains a single data element.

The plurality of stack tag sets are used to identify beginning and ending locations of a corresponding plurality of individual stacks contained within the data array. Each of the stack tag sets thus shares the data array with the other stack tag sets. Each of the stack tag sets includes a top of stack (TOS) register and a bottom of stack (BOS) register. The TOS register contains an array address where the top of stack is stored in the data array. It also contains the memory address of the top of stack. The BOS register contains an array address where the bottom of stack is stored in the data array. It also contains the memory address of the bottom of stack. The stack tags dedicated to each of the stacks within the data array are concurrently managed.

The backward pointer array is an array of registers which provide the mapping mechanism to permit the individual stack data elements contained in the data arrays to be linked together in the appropriate order. Each backward pointer register is associated with a particular storage location in the data array. As each of the stacks grow, the backward pointer points to the location of the previous top of the stack in the data array.

The free space manager comprises an in-use state array, data array allocation logic and a next free space (NFS) register. The in-use state array contains a single bit which represents each of the plurality of storage locations comprising the data array. As the length of one or more of the stacks grow and shrink, data elements contained in the data array are added and pulled off of the various stacks. Accordingly, an in-use state bit is used to identify whether each of the storage locations in the array is currently in use or not in use.

The data array allocation logic decodes the information from the in-use state array and determines, based on this decoding operation, which storage locations in the array are in use. Based on this determination, the address of a not in-use storage location is designated as available for further PUSH operations to existing or not yet created stacks. The NFS register provides the next available storage location address to the top of stack (TOS) register in the stack tag set which is the destination of the next PUSH operation. An array full signal is used to indicate when all the storage locations of the data array are in use, that is, all of the storage locations in the array contain a data element.

DETAILED DESCRIPTION OF THE PREFERRED EMBODIMENT

Figure 1:
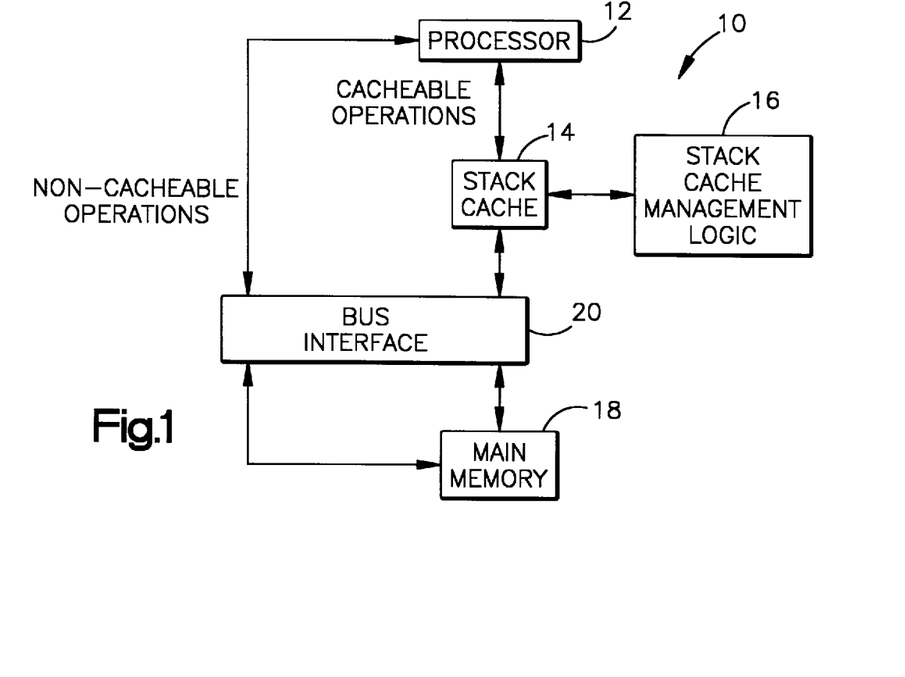
FIG. 1 is a block diagram of a processor-based computer system which includes stack cache support logic constructed according to the principles of the present invention.

A block diagram of a system 10 which incorporates the stack cache management mechanism provided by the present invention is provided in FIG. 1. The system 10 comprises a microprocessor 12, a stack cache 14, stack cache management logic 16 and a main memory 18. The main memory 18 is connected to the stack cache 14 and the processor 12 by means of a bus interface 20.

The stack cache 14 is a special-purpose buffer storage device which is smaller and faster than main memory 18. The stack cache 14 is used to hold a copy of temporary data obtained from the main memory 18 which are likely to be used again by the processor 12. The data likely to be contained in the stack cache 14 are those which are frequently accessed by the processor 12, thereby serving to reduce the access time which would otherwise be required if the processor were to go to main memory for the data. As used herein, data and operands are referred to generally as "data".

The processor of the system of FIG. 1 supports the software concept of stacks within the cache 14. Stacks are address ranges to which the processor has access through PUSH and POP operations. The stacks are implemented in the form of data arrays. Data contained at storage locations within the array are herein each referred to as a "data element", and individual POP read and PUSH write operations executed by the processor involve removal or addition of a data element to and from storage locations within the stack.

The length of the stacks may continuously change during execution of stack operations. Moreover, the number of stacks may change. In multi-tasking environments, individually operating programs may each involve operations to separate stacks, and thus at any given moment, multiple stacks may be in existence.

The individual data elements in the cache may not be seen or addressed by the processor unless the processor issues a POP operation. The POP operation retrieves data in a last in first out (LIFO) order in relation to PUSH operations.

Figure 2:
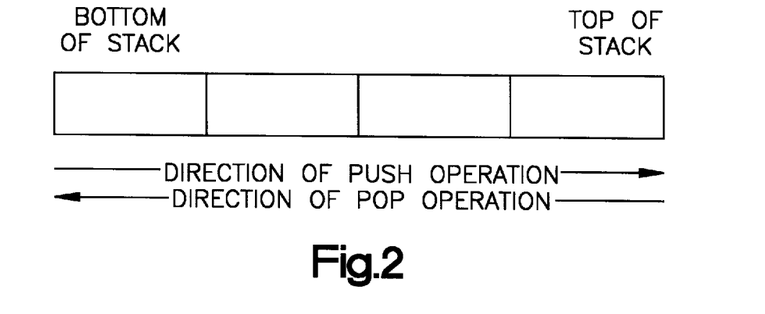
FIG. 2 is a diagram of the construction of a stack data cache supported by the computer system of FIG. 1.

The cache of FIG. 2 supports the POP read operations and PUSH write operations referred to above, which operations function to shorten and lengthen the stack, respectively. For POP read operations, data elements are removed (POPPED) from the top of the stack. For PUSH write operations, data elements are added (PUSHED) onto the top of the stack. Accordingly, the length of the stack grows or shrinks based on the number of PUSH or POP operations executed by the processor 12 to the stack. The only visible portion of the stack to operating software is the top of the stack (TOS in FIG. 3). Such strict management of POP and PUSH operations is found in many RISC (reduced instruction set computer) architectures.

The stack cache management logic 16 is a functional algorithm which is implemented in hardware form, for example, in silicon, and which manages stack cache operations in the system. The features introduced by the stack cache management logic are transparent to existing system software, and thus, no changes must be made to the existing software for a system to realize a significant performance gain. Stack cache operations which are managed by the stack cache management logic 16 include PUSH and POP operations to and from the stacks.

Figure 3:
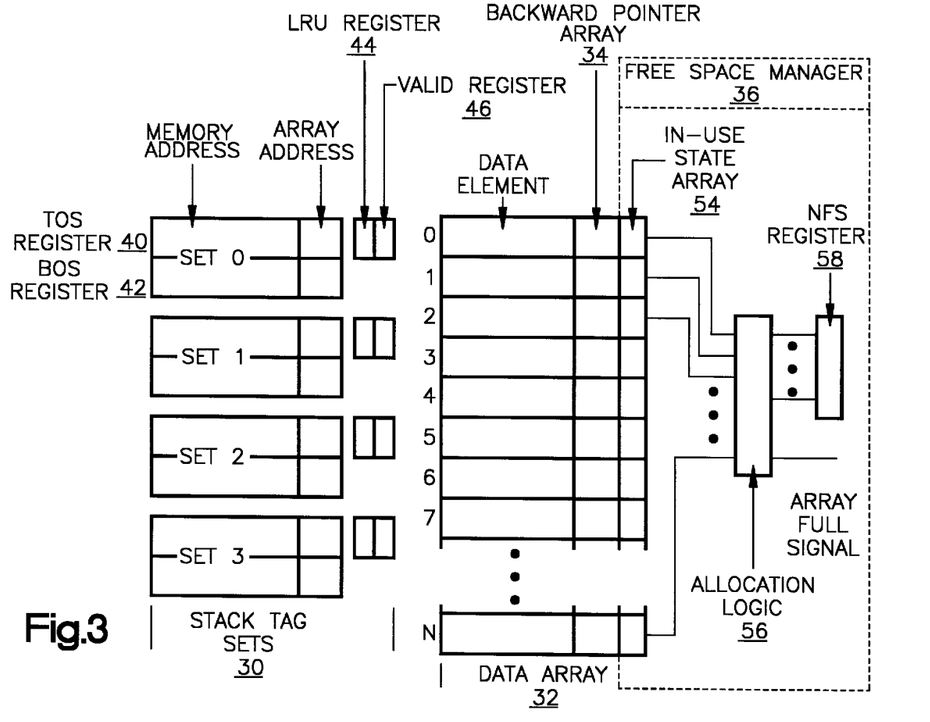
FIG. 3 is a block diagram of the implementation of the stack cache management logic of FIG. 1.

FIG. 3 is a block diagram illustrating the implementation of the stack cache management logic 16 of FIG. 1. As shown in FIG. 3, the logic 16 includes stack tag sets 30, a data array 32, a backward pointer array 34 and a free space manager 36.

The data array 32 comprises an array of storage locations provided by, for example, registers, thereby providing a fixed amount of storage which contains the actual stack data. The array of registers which make up the data array may be implemented in static random access memory (SRAM). The SRAM stores the data which have been placed into a stack as a result of a PUSH operation. In the preferred embodiment, each storage location in the data array 32 contains a data element.

The stack cache management logic 16 permits a plurality of stacks, each of varying length, to be defined within the data array 32. The plurality of stack tag sets 30 are used to identify beginning and ending locations of a corresponding plurality of individual stacks contained within the data array. Each of the stack tag sets 30 thus shares the data array with the other stack tag sets. Each of the stack tag sets includes a top of stack (TOS) register 40, a bottom of stack (BOS) register 42, a least recently used (LRU) register 44 and a single bit valid register 46.

The TOS register 40 contains the memory address of the top of stack, and an array address of the data element corresponding to the top of a stack associated with that individual stack tag set. The BOS register 42 contains the memory address of the bottom of stack, and the address of the data element corresponding to the bottom of a stack associated with that individual stack tag set. Four stack tag sets 30, set 0 through set 3, are shown in FIG. 3. Each stack tag set identifies the top and bottom of a stack defined within the data array 32.

The stack tags dedicated to each of the stacks within the data array are concurrently managed by the stack cache management logic 16. The logic 16 permits the four stack tag sets (0–3) to be mapped into the single data array 32 so that each individual stack does not need to be mapped into a separate data array. In this manner, effective use of available memory is ensured, and the processor has access to the entire data array for compiling a plurality of stacks. Each of the stack tag sets is effectively a list of data elements which is linked together to form a stack.

In addition to the TOS and BOS registers, the least recently used (LRU) register 44 and the single bit valid register 46 provide additional information regarding stack operation. The LRU register 44 indicates which stack tag set is the least recently used stack tag set. The single bit valid register 46 indicates if a stack corresponding to the stack tag set is currently in use (i.e., the TOS and BOS registers define the top and bottom addresses of a particular stack in the array 32), or if the stack tag set is currently not in use (i.e., the TOS and BOS registers are empty).

The backward pointer array 34 is an array of registers which provide the mapping mechanism to permit the individual stack tag sets 30 to be mapped to the data array 32. Each backward pointer register is associated with a particular storage location in the data array 32. As each of the stacks grow, the backward pointer array 34 points to the location of the storage location in the data array where the previous PUSH operation for that stack is saved. Like the data array 32, the backward pointer array 34 may be implemented in SRAM.

The free space manager 36 comprises an in-use state array 54, data array allocation logic 56 and a next free space (NFS) register 58. The in-use state array contains a single bit which represents each of the plurality of storage locations in the data array 32. As the length of one or more of the stacks grow and shrink, data elements of the array 32 are added and pulled off of the various stacks. Accordingly, an in-use state bit is used to identify whether each of the storage locations in the array 32 is currently in use (i.e., part of a stack) or not in use (i.e., not part of a stack and thus available to be allocated to a stack). The in-use state bit is reset to "0" when its corresponding data array storage location is available and is set to "1" when the location is in use in a stack.

Like the data array 32 and backward pointer array 34, the in-use state array 54 may be implemented in SRAM. Accordingly, the individual registers which make up the backward pointer array 34 and the individual registers which make up the in-use state array 54 can be considered extensions of the field of information corresponding to each storage location in the data array 32.

The data array allocation logic 56 decodes the information included in the in-use state array 54 and determines, based on this decoding operation, the address of a storage location in the array 32 for assignment to the next PUSH operation. The allocation logic is implemented as simply a $2_N$ to N priority encoder. The in-use storage locations have data elements contained therein as a result of PUSH operations. The not in-use storage locations have not been written to or have had data elements POPPED therefrom.

The not-in-use storage locations are designated as available for further PUSH operations to existing or not yet created stacks. Because PUSH operations are always to the top of the stack, the NFS register 58 provides this next available storage location address to the top of stack (TOS) register 40 in the stack tag set which is the destination of the next PUSH operation. In this manner, the TOS register is provided with an address corresponding to the next free storage location in the data array identified to it by the NFS register 58.

In the PUSH operation, for example, the allocation logic 56 in the free space manager 36 identifies and allocates the next free storage location in the data array as a destination for the PUSH operation, as long as a storage location in the data array 32 is still available. The identified data array address is saved in the array address portion of the TOS register 40, and the actual memory address of the stack data is stored in the memory address portion of the TOS register. (In the case of the first PUSH operation, the array address and the memory address are also stored in the BOS register 42, as will be further explained below). The backward pointer identified by the NFS register 58 as the pointer associated with the identified storage location stores the address which was previously contained in the data array address portion of the TOS register 40. The data element which is being PUSHED is then stored in the identified storage location in the array 32. The in-use state register bit corresponding to this identified storage location is set to "1".

The first PUSH to a new stack is identified as such if none of the addresses in the memory address portion of the TOS/BOS registers corresponds to the destination of the requested PUSH operation. In such a case, an available TOS/BOS register pair is assigned. For this initial assignment, the NFS register 58 identifies the assigned stack storage location address and this address, along with the actual memory address of the stack data element, are stored in the array address and memory address portions TOS and BOS registers, respectively.

With each successive PUSH operation, the data array address which was previously saved in the TOS register 40 in the destination stack is stored in the backward pointer associated with the newly assigned storage location. In this manner, the PUSH operations are effectively linked together in the same stack. Because successive PUSH operations involve memory addresses which correspond to the same TOS/BOS register pair, these successive PUSH operations are associated with the same stack. The TOS register saves the array address of each new storage location assigned by the NFS register 58, and the memory address portion of the TOS register 40 associated with top of stack is incremented. Thus, the memory address of the BOS register 42 maintains the memory address of the initial data element assigned to the stack, and the memory address portion of the TOS register 40 maintains the memory location of the top of the stack.

In a POP operation, the TOS register 40 has saved therein the data array address where the processor data was stored as a result of the last PUSH operation. The stack cache management logic 16 accesses this stack cache location and presents the contents of the data array to the processor. The logic also accesses the backward pointer corresponding to this storage location and stores its contents (the data element address) into the TOS register 40. The backward pointer to the data element thus saved in the TOS register now points to the address of the data element corresponding to the next to last PUSH operation. The memory address portion of the TOS register is decremented, and the in-use state register bit corresponding to the data element just POPPED is reset to "0". The data array storage location corresponding to this POPPED data element is now free to be assigned to new PUSH operations.

For each successive POP operation, the process is repeated by the stack cache management logic 16 until both TOS and BOS registers contain the same data array address. At this time, the memory address portion of the TOS register 40 and the memory address portion of The BOS register 42 are also the same. This condition represents the same register state as the initial PUSH operation executed by the processor and, thus, the next POP operation represents the last and final POP operation by the processor to this stack. The stack tag set which is thus freed by the final POP operation is now free for reassignment.

Figure 4:
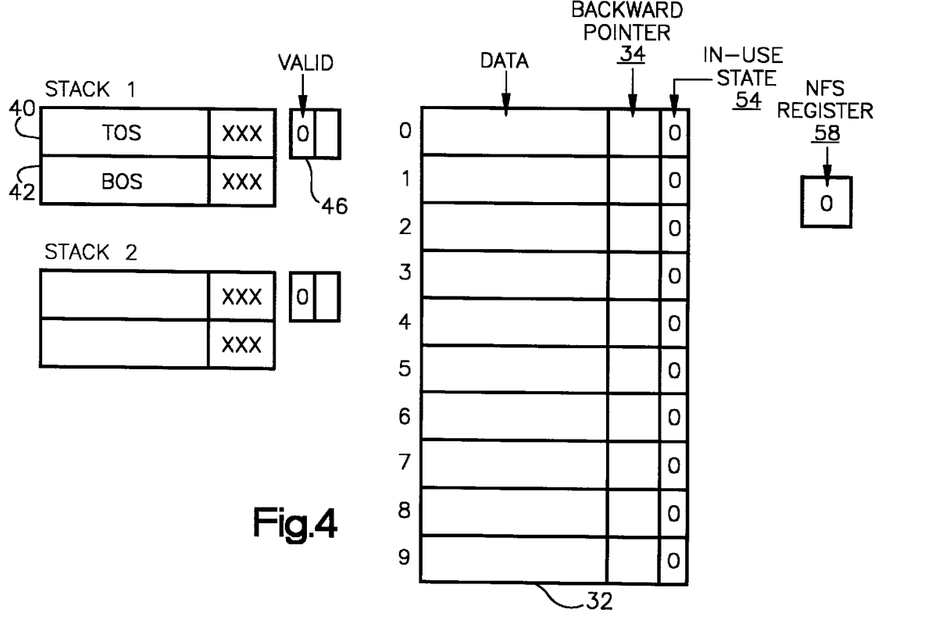
FIGS. 4–11 illustrate the contents of various registers of the system of FIG. 1 during PUSH and POP operations.

FIGS. 4–11 illustrate the contents of various registers of the system of FIG. 1 during PUSH and POP operations. FIG. 4 represents the initial state of the registers in the system. For the purpose of this example, only two stack tags sets 30 will be illustrated. Values shown in the registers as either blank or XXX are "don't care" values which have no significance. Initially the single bit valid registers 46 for all the stack tag sets are set at zero, indicating that no stacks currently exist in the cache. The NFS register 58 points to a free storage location in the data array 32, which initially, is location "0".

Figure 5:
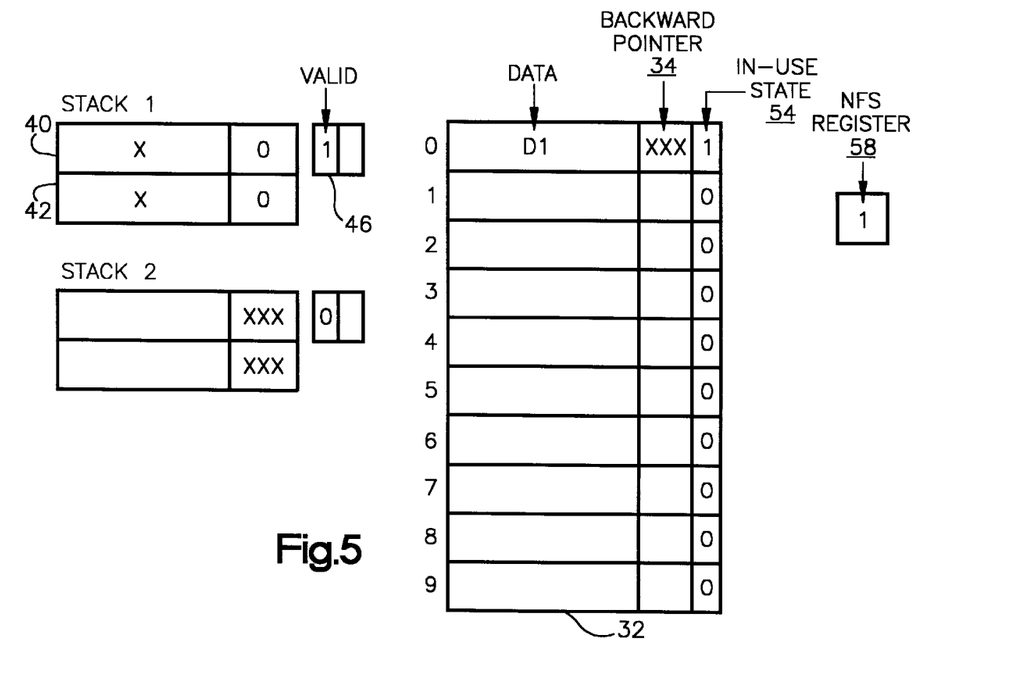

FIG. 5 illustrates the register contents during the first PUSH operation. Because no valid stack tag sets yet exist, no stacks are contained in the stack cache. Therefore the first new stack will be created using stack tag set 1. The memory address "X" of the stack data along with the data array address of where this data will be stored in the stack cache are stored in both the TOS register 40 and BOS register 42 of stack tag set 1. The data array address which is stored is the array address indicated by the NFS register 58. The stack data D1 is stored in the data array at the location that was indicated by the NFS register, in this case location "0". The backward pointer that will be stored is the value which was previously contained in the data array address portion of the TOS register 40. The value is "don't care" in this case because it is the first PUSH operation to this stack. The in-use bit for the data array location "0" is set to "1", indicating that this data array element is now part of an active stack. The single bit valid register 46 for the first stack tag set is also set to one indicating that this stack set contains an active stack. The NFS register 58 is updated to indicate the next available storage location in the data array, in this case location "1".

Figure 6:
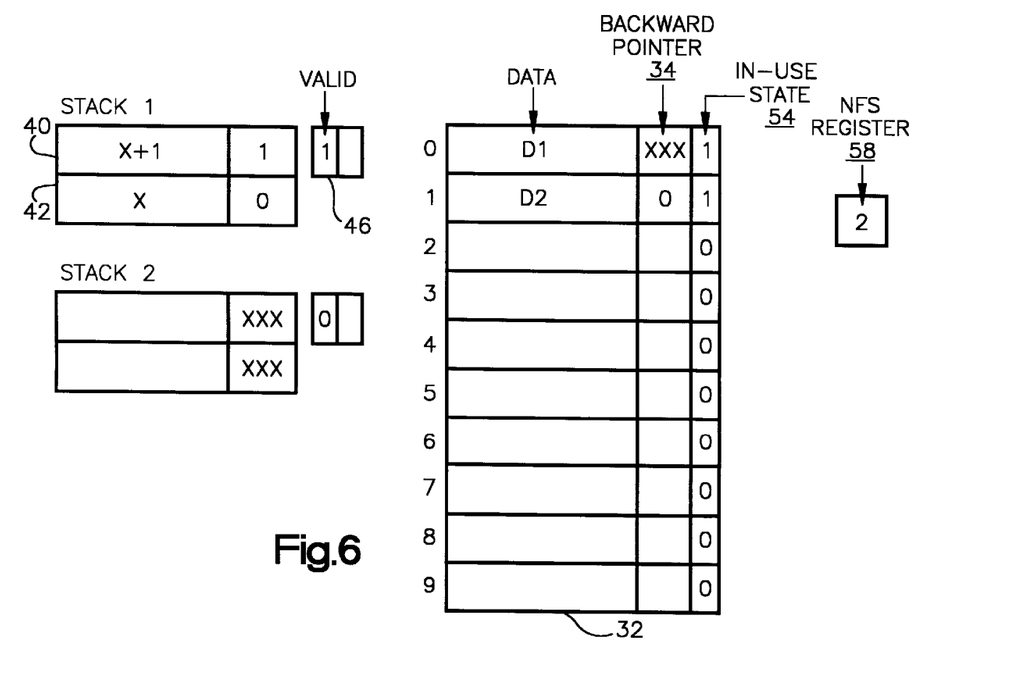

A second PUSH operation to stack tag set one is performed as shown in FIG. 6. The memory address value contained in the active TOS registers 40 are compared against the memory address of the current PUSH operation to determine if the current PUSH operation is destined for any of the active stacks. The determination is made, in this case, that the current PUSH is destined for the first stack tag set. The operations which the stack logic 16 executes are similar to those executed for the initial PUSH to the stack except that during the second PUSH the contents of the BOS register 42 are not changed. The stack data D2 for the current PUSH operation is stored in the data array location "1" indicated by the NFS register. The data array address which was previously saved in the TOS register 40, data array location "0", is stored in the backward pointer array register associated with the newly assigned data array location "1". The TOS register 40 is now updated with the stack data memory address, which is the previous top of stack memory address plus one, and the data array address where the data is stored in the array, in this case "1". The NFS register 58 is now updated to point to the next available storage location in the data array, in this case data location "2".

Figure 7:
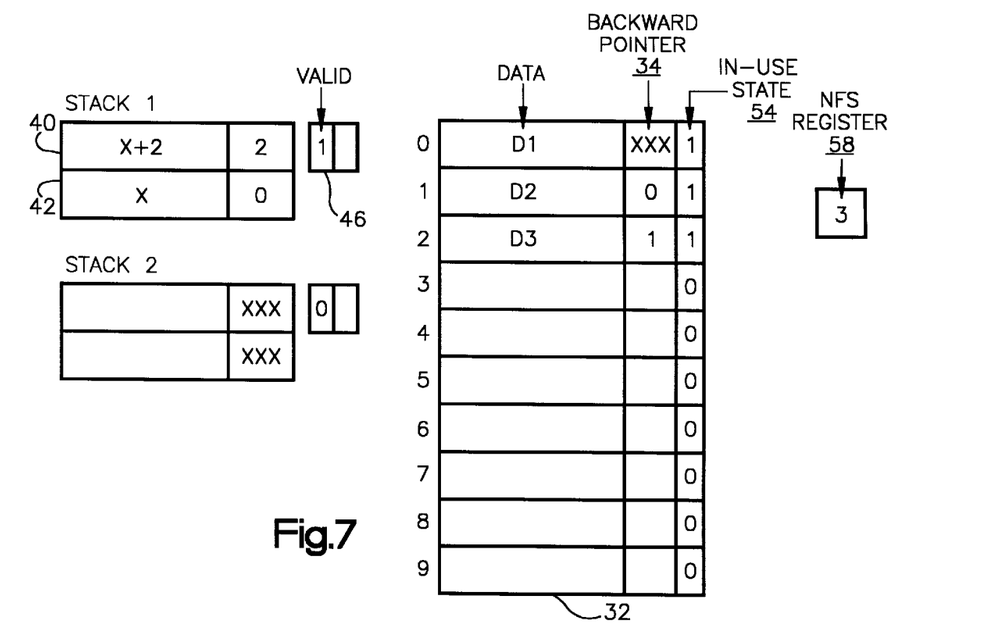

A third PUSH operation to stack tag set one is performed as shown in FIG. 7. The memory address value contained in the active TOS registers are compared against the memory address of the current PUSH operation to determine if the current PUSH operation is destined for any of the active stacks. The determination is made, in this case, that the current PUSH is to stack tag set one. The stack cache management logic 16 follows the same procedure as described above for the previous (second) PUSH operation.

Figure 8:
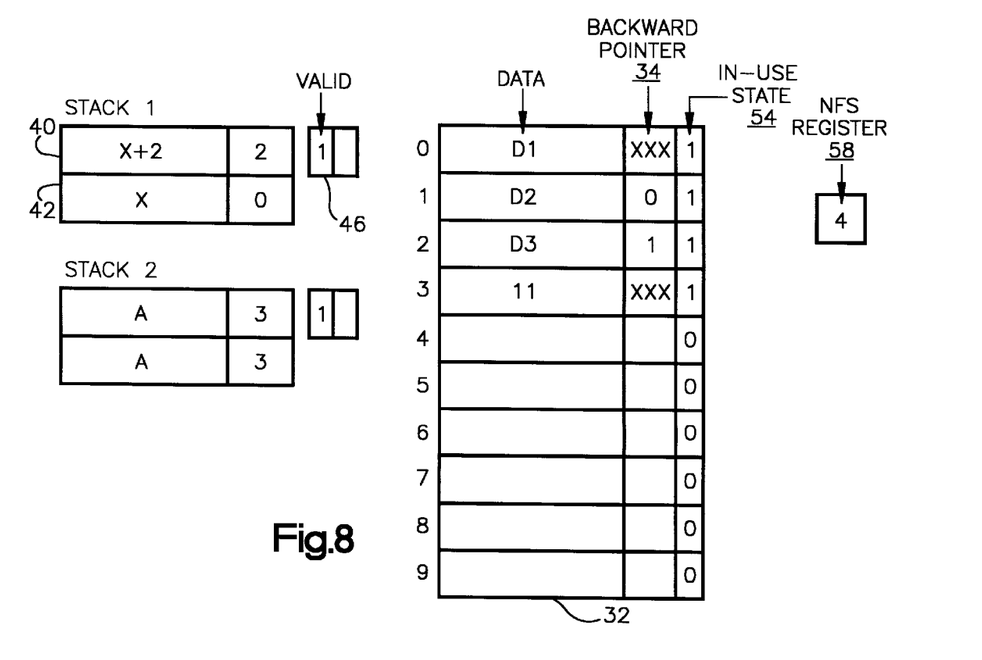

A fourth PUSH operation (the first to stack tag set two) is performed as shown in FIG. 8. The memory address value contained in the active TOS registers are again compared against the memory address "A" of the current PUSH operation to determine if this operation is a PUSH to any of the active stacks. The determination is made, in this case, that this PUSH is not to any active stacks in the stack cache. Therefore the single bit valid registers 46 are checked to determine if a stack tag set is available. In this case stack tag set two is not in use. The ensuing operation for the first PUSH to stack tag set two is similar to that described above with respect to stack tag set one.

Figure 9:
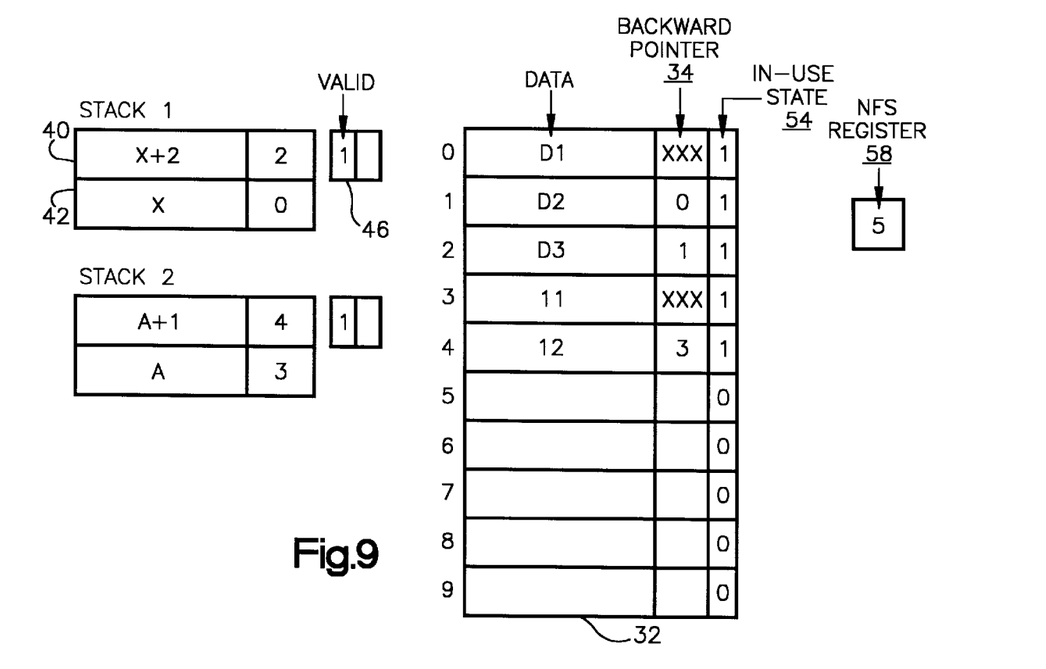

A fifth PUSH operation (the second to stack tag set two) is performed as shown in FIG. 9. The memory address value contained in the active TOS registers are again compared against the memory address of the current PUSH operation to determine if this is a PUSH to any of the active stacks. The determination is made, in this case, that this is a PUSH to stack tag set 2. This operation is similar to the second and third PUSH operations to stack tag set one.

Figure 10:
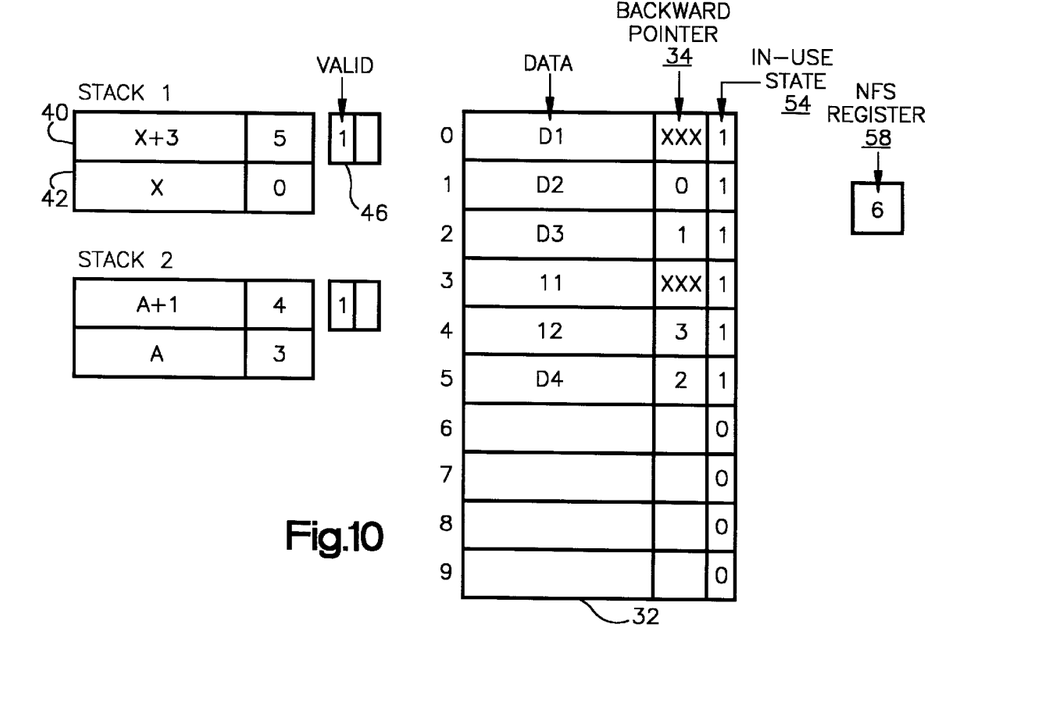

A sixth PUSH operation, this time the fourth to stack tag set one, is performed as shown in FIG. 10. The memory address value contained in the active TOS registers are compared against the memory address of the current PUSH operation to determine if this is a PUSH to any of the active stacks. The determination is made, in this case, that this is another PUSH to stack tag set one. This operation is similar to the previous PUSH operations to stack tag set one. However, it should be noted that the elements in the data array 32 which comprise a specific stack do not have to be contiguous. In this case the data for stack tag set one are stored in data array locations "0", "1", "2", and "5".

Figure 11:
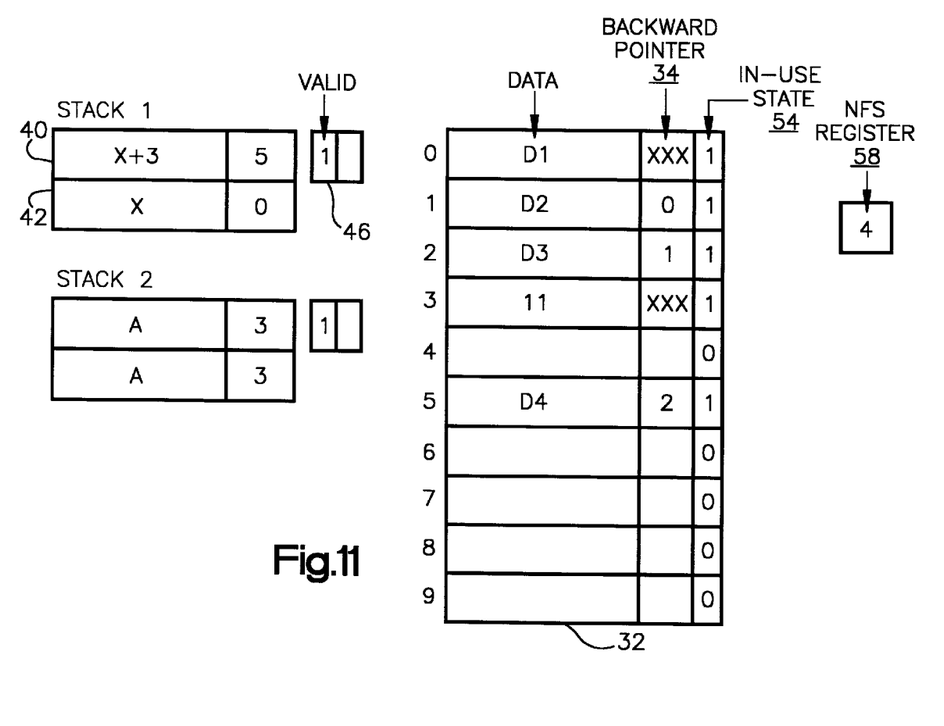

A POP operation from stack tag set two is performed as shown in FIG. 11. The memory address values contained in the active TOS registers are compared against the memory address of the POP operation to determine if this current POP operation is a POP from any of the active stacks in the cache. The determination is made, in this case, that this is a POP operation from stack tag set two. The contents of the data array pointed to by the data array address in the TOS register 40 is provided to the processor. The in-use state bit for this location in the data array is reset to "0" indicating this data array storage location is again available.

The memory address in the TOS register 40 is now compared to the memory address in the BOS register 42. If these two addresses match, the stack is empty and the POP read operation just completed would represent the final POP for this stack. The single bit valid register 46 would therefore be set to "0". However, in the case illustrated by FIG. 11, the memory address in the TOS register 40 does not match the memory address in the BOS register 42. Thus, the memory address in the TOS register 40 is decremented and the data array address contained in the TOS register is updated with the backward pointer from the array element which had just been accessed. The storage location "4" associated with the freed data array element is now available and the NFS register 58 will indicate that this location is the next available storage location for a data element.

When either all of the stack tag sets 30 are exhausted or all of the storage locations in the data array 32 are exhausted, and another PUSH operation is initiated, the entire stack associated with a particular stack tag set is stored in main memory 18. Exhaustion of storage locations is indicated by the array full signal from the allocation logic 56. The particular stack tag set sent to memory is the stack tag set indicated by the LRU register 44 as the least used stack tag set. The memory address portion of the TOS/BOS register pair is used for storing the stack cache data in the main memory 18. In this manner, the stack tag sets which are most used are maintained active. Once the stack tag set is sent to memory, the single bit valid register 46 is reset to indicate that the stack tag set is now not valid and may be used to identify another stack within the data array 32.

To provide better system performance, a predetermined amount of storage space in the data array 32 may be designated as a threshold. If this designated storage is allocated to a stack or stacks by the allocation logic 56, that is, the threshold is crossed, the least used stack tag set with its associated stack cache data may be stored in main memory, before the entire storage provided by the data array 32 is completely exhausted. Such operation permits the stack cache associated with this particular stack tag set to be stored into memory concurrently with the execution of new PUSH operations.

If a POP operation is executed and the data to be POPPED has already been sent to memory, the memory address of the data to be POPPED will not match any memory address associated with the TOS and BOS registers in any of the valid stack tag sets. In this situation, the data is retrieved from memory but is not sent to the stack cache; rather it is sent directly to the processor 12.

The present invention as described above effectively utilizes storage space which is designated for cache use. The management of the data array 32 as a free pool of storage which may be allocated to any stack permits all of the cache space to be fully utilized regardless of the addressing pattern of the stacks. The cache is thus physically partitioned in a manner which permits a given memory address to be mapped to any cache location as opposed to a dedicated stack within a set associative cache management scheme. As a result, the stack cache may be utilized in less memory than previous designs utilizing such an associative management scheme.

Accordingly, the preferred embodiment of management logic for a microprocessor stack cache has been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

We claim:

1. A stack cache memory device for use in a computer system including a main memory and a processor, said stack cache memory device comprising:

a data array comprising a plurality of storage locations in which stack data elements may be stored, said data array providing pooled storage space which may be allocated to any stack mapped therein;

a plurality of individual stack tag sets for identifying beginning and ending locations of a corresponding plurality of individual stacks mapped within said data array, each of said individual stack tag sets comprising (i) a first register for containing an address in said data array corresponding to the top of a stack associated with that individual stack tag set and (ii) a second register for containing an address in said data array corresponding to the bottom of a stack associated with that individual stack tag set;

a backward pointer array for mapping each of said plurality of individual stack tag sets to address locations in said data array, said backward pointer array comprising a plurality of backward pointer registers each of which is associated with a particular storage location in said data array;

an in-use state array for identifying addresses of data array storage locations currently having data elements stored therein and addresses of data array storage locations currently having no data elements stored therein; and allocation logic for: (i) identifying as a free space address a storage location in said data array which is not presently allocated to a stack, as determined by said in-use state array;

(ii) determining the priority level of said identified free space address; and (iii) allocating said identified free space address to a stack upon the next PUSH operation if said priority level of said free space address is higher than any other identified addresses of data array storage locations currently having no data elements stored therein.

2. The device of claim 1, wherein said allocation logic identifies said free space by decoding available addresses identified by said in-use state array and encoding said available addresses for said stack tag sets.

3. The cache memory device of claim 1 further comprising:

(a) an array full signal for indicating that all N data registers include stack data; and (b) logic for transferring a least recently used stack tag set and its associated data registers to a main memory system responsive to a push stack operation and an indication of the array full signal that all N data registers include stack data.

4. The device of claim 1, wherein said in-use state array comprises a plurality of in-use state bits each of which is associated with a particular storage location in said data array.

5. The device of claim 4, wherein said in-use state array, said data array and said backward pointer array are implemented in SRAM.

6. The device of claim 1, wherein each of said stack tag sets include a least-used register for identifying the stack tag set which is least used.

7. The device of claim 6, further comprising logic for storing in main memory the data elements contained in a stack defined by the stack tag set identified as the least used stack tag set.

8. A method of storing data in a cache in a computer system including a main memory and a processor, comprising the steps of:

providing a data array comprising a plurality of storage locations in which stack data elements may be stored, said data array providing pooled storage space which may be allocated to any stack mapped therein;

identifying beginning and ending locations of a corresponding plurality of individual stacks mapped within said data array with a plurality of individual stack tag sets, each of said individual stack tag sets comprising (i) a first register for containing an address in said data array corresponding to the top of a stack associated with that individual stack tag set and (ii) a second register for containing an address in said data array corresponding to the bottom of a stack associated with that individual stack tag set;

mapping each of said plurality of individual stack tag sets to address locations in said data array with a backward pointer array, said backward pointer array comprising a plurality of backward pointer registers each of which is associated with a particular storage location in said data array;

identifying, using an in-use state array, addresses of data array storage locations currently having data elements stored therein and addresses of data array storage locations currently having no data elements stored therein;

identifying as a free space address a storage location in said data array which is not presently allocated to a stack, as determined by said in-use state array;

determining the priority level of said identified free space address; and allocating said identified free space address to a stack upon the next PUSH operation if said priority level of said free space address is higher than the priority level of any other identified addresses of data array storage locations currently having no data elements stored therein.

9. The method of claim 8, wherein said in-use state array comprises a plurality of in-use state bits each of which is associated with a particular storage location in said data array.

10. The method of claim 8, wherein said step of identifying said free space comprises the steps of decoding available addresses identified by said in-use state array and encoding said available addresses for said stack tag sets.

11. The method of claim 8, further comprising the step of identifying, using a least-used register, the stack tag set which is least used.

12. The method of claim 11, further comprising the step of storing in the main memory the data elements contained in a stack defined by the stack tag set identified as the least used stack tag set.

13. A computer system, comprising:
a processor;
a main memory device;
a data array comprising a plurality of storage locations in which stack data elements may be temporarily stored, said data array providing pooled storage space which may be allocated to any stack mapped therein;
a plurality of individual stack tag sets for identifying beginning and ending locations of a corresponding plurality of individual stacks mapped within said data array, each of said individual stack tag sets comprising (i) a first register for containing an address in said data array corresponding to the top of a stack associated with that individual stack tag set and (ii) a second register for containing an address in said data array corresponding to the bottom of a stack associated with that individual stack tag set;
a backward pointer array for mapping each of said plurality of individual stack tag sets to address locations in said data array, said backward pointer array comprising a plurality of backward pointer registers each of which is associated with a particular storage location in said data array;
an in-use state array for identifying addresses of data array storage locations currently having data elements stored therein and addresses of data array storage locations currently having no data elements stored therein; and
allocation logic for:
(i) identifying as a free space address a storage location in said data array which is not presently allocated to a stack, as determined by said in-use state array;
(ii) determining the priority level of said identified free space address; and
(iii) allocating said identified free space address to a stack upon the next PUSH operation if said priority level of said free space address is higher than the priority level of any other identified addresses of data array storage locations currently having no data elements stored therein.

14. The system of claim 13, wherein said allocation logic identifies said free space by decoding available addresses identified by said in-use state array and encoding said available addresses for said stack tag sets.

15. The system of claim 13, wherein said in-use state array comprises a plurality of in-use state bits each of which is associated with a particular storage location in said data array.

16. The system of claim 15, wherein said in-use state-array, said data array and said backward pointer array are implemented in SRAM.

17. The system of claim 13, wherein each of said stack tag sets include a least-used register for identifying the stack tag set which is least used.

18. The system of claim 17, further comprising logic for storing in main memory the data elements contained in a stack defined by the stack tag set identified as the least used stack tag set.

19. A cache memory device comprising:
(a) a data register set having:
 (1) N data registers for storing stack data; where N is any integer greater than zero;
 (2) N backward pointer registers for storing pointer data that indicates which of N data registers is antecedent to any one N data register;
 (3) N in-use registers for indicating whether a particular data register includes stack data;
(b) at least M stacks, each including a stack tag set for indicating the top and bottom of a stack, wherein M is any integer less than N and greater than 1, each stack tag set comprising:
 (1) a top of stack register for storing the memory address of a data element to be stored in the top of stack;
 (2) a top of stack data array register for storing which of the N data registers corresponds to the top of stack register;
 (3) a least recently used stack register for indicating which of M stacks is least recently used;
 (4) a bottom of stack register for storing the memory address of a data element stored in the bottom of stack;
 (5) a bottom of stack data array register for storing which of N data registers corresponds to the bottom of stack register; and
 (6) a valid stack register for indicating if a particular stack is currently in use;
(c) logic for determining which stack of M stacks a push or pop stack operation is destined;
(d) free space management logic for determining which of N data registers are available for storing stack data; wherein said free space management logic comprising allocation logic for identifying registers as free space for assignment to any of M stacks; wherein the allocation logic comprises a priority encoder for identifying the priority level of which of N data registers are available for storing stack data; and
(e) at least one next free space register for indicating the address of which of N data registers has been identified as free space by having the highest priority level.

20. A method for managing M stacks in an N data register set, wherein M is any integer less than N and greater than 1 and N is any integer greater than 0, the method comprising the steps of:
(a) generating a first stack in the N data register set, wherein this step comprises the steps of:
 (1) identifying a Z register, wherein Z is any register within the N data register set;
 (2) storing stack data to the Z register in the N data register set, and
 (3) identifying the Z register as the bottom of the first stack;
(b) generating a second stack in the N data register set, wherein this step comprises the steps of:
 (1) identifying a Y register in the N data register set, wherein Y is any register within the N data register set, different from the identified Z register,
 (2) storing stack data to the Y register, and
 (3) identifying the Y register as the bottom of the second stack; and
(c) identifying a free space register in the N data register set which may be assigned any of M stacks; wherein this step comprises the steps of:
 (1) determining the priority level of the free space register; and (2) allocating the free space register to a stack upon the next PUSH operation if the priority level of the identified free space register is higher than the priority level of any other identified free space register.

21. A method for managing M stacks in an N data register set, wherein M is any integer less than N and greater than 1 and N is any integer greater than 0, the method comprising the steps of:

(a) responsive to a PUSH stack operation, determining whether any stacks exist in the N data register set;

(b) responsive to a determination that no stacks exist in the N data register set, generating a first stack, wherein this step comprises the step of generating a first stack tag set, wherein this step comprises the steps of:
  (1) generating a top of stack register entry, wherein this step comprises the steps of:
    a. identifying a free register in the N register data set for storing first stack data;
    b. storing the memory address of data to be stored in the first stack in the top of stack register entry; and
    c. storing the address of the free register in the top of stack register entry;
  (2) generating a bottom of stack register entry, wherein this step comprises the steps of:
    a. storing the memory address of data to be stored in the first stack in the bottom of stack register entry; and
    b. storing the address of the free register in the bottom of stack register entry;

(c) determining whether additional stacks are required;

(d) responsive to a determination that additional stacks are required, generating additional stacks within the N data register set, wherein this step comprises the step of generating a stack tag set for each required additional stack, wherein this step comprises the steps of:
  (1) generating a top of stack register entry, wherein this step comprises the steps of:
    a. identifying a free register in the N register data set for storing stack data;
    b. storing the memory address of the data to be stored in the required additional stack in the top of stack register entry; and
    c. storing the address of the free register in the top of stack register entry;
  (2) generating a bottom of stack register entry, wherein this step comprises the steps of:
    a. storing the memory address of the data to be stored in the required additional stack in the bottom of stack register entry; and
    b. storing the address of the free register in the bottom of stack register entry;

(e) identifying a free space register in the N data register set which may be assigned any of M stacks; wherein this step comprises the steps of:
  (1) determining the priority level of the free space register; and
  (2) allocating the free space register to a stack upon the next PUSH operation if the priority level of the identified free space register is higher than the priority level of any other identified free space register.

* * * * *